2,727,902
Patented Dec. 20, 1955

2,727,902

PROCESS FOR THE PRODUCTION OF ALIPHATIC OXYGEN COMPOUNDS BY CARBONYLATION OF ALCOHOLS AND ETHERS

Walter Reppe, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Application December 4, 1952, Serial No. 324,133

Claims priority, application Germany December 18, 1951

21 Claims. (Cl. 260—343.5)

This invention relates to the production of aliphatic oxygen compounds, in particular carboxylic acids, their esters and anhydrides, by the interaction of alcohols or ethers with carbon monoxide in the presence of novel carbonylation catalysts. More particularly, our invention relates to heating a lower aliphatic saturated alcohol or an ether thereof with carbon monoxide or a mixture thereof with hydrogen under superatmospheric pressure in the liquid phase in the presence of novel carbonylation catalysts. In still more specific terms our invention is directed to the synthesis of low molecular saturated aliphatic carboxylic acids, their esters and anhydrides by treating lower aliphatic saturated alcohols with carbon monoxide-containing gases under superatmospheric pressure at elevated temperatures in the presence of complex cobalt halides.

It has been known that alcohols, in particular methanol, or their ethers may be carbonylated to form aliphatic oxygen compounds containing more carbon atoms than the starting material. In these carbonylations either carbon monoxide or mixtures thereof with hydrogen have been used, the reaction conditions as to temperatures and pressures have been varied to a large extent and a number of catalysts have been proposed.

It is generally accepted today that carbonyl-forming metals or their compounds are the most active catalysts for such carbonylations. They are far superior to other catalysts both in rate of conversion and yields of the desired materials. Nevertheless, the known carbonylation catalysts of this type have some drawbacks. They are converted into metal carbonyls in the course of the reaction and dissolved as such in the reaction product. This makes it necessary to regenerate the carbonyl forming metal as a matter of purification and economy.

It is an object of our invention to provide for the carbonylation of alcohols or ethers with carbon monoxide catalysts which give satisfactory rates of conversion and yields and are free from the drawback mentioned above.

According to our invention the reaction of methanol and other saturated lower aliphatic alcohols and their ethers is carried out in the presence of complex cobalt halides which contain in the molecule in addition to the cobalt halide also an organic onium halide, e. g. an ammonium or phosphonium halide.

Suitable catalysts of this type are in particular the tertiary and quaternary ammonium cobalt bromides, corresponding bromides-iodides or the iodides. These compounds correspond to the general formula:

[A₄N]₂.Co.X₄ wherein A stands for a lower molecular alkyl radicle, in particular a hydrocarbon radicle, or two of the A form an alkylene radicle, and X stands for a halide ion, in particular bromide or iodide ion. It is selfunderstood that in the tetra-alkyl ammonium radicle as defined above several of the alkyl groups may be replaced by aralkyl or cyclo alkyl radicles, or that another quaternary ammonium compound may be used, such as benzyl or alkyl pyridinium radicles. To cite a few examples of such compounds we name e. g.:

Triethyl butyl ammonium cobalt bromide

[(C₂H₅)₃(C₄H₉)N]₂.CoBr₄

Diethyl dibutyl ammonium cobalt iodide

[(C₂H₅)₂(C₄H₉)₂N]².CoJ₄

Tetra propyl ammonium cobalt bromide iodide

[(C₃H₇)₄N]₂.CoBr₂J₂

Trimethyl cyclohexyl ammonium cobalt bromide

[(CH₃)₃(C₆H₁₁)N]₂CoBr₄

Butyl pyridinium cobalt bromide

[(C₅H₅N)(C₄H₉)]₂.CoBr₄

Benzyl pyridinium cobalt iodide

[(C₅H₅N)(C₆H₅CH₂)]₂.CoJ₄ and analogous compounds.

Instead of the ammonium compounds, we may as well use the corresponding phosphonium compounds, in particular the triaryl alkyl phosphonium cobalt bromides, wherein the alkyl contains between 1 and 6 carbon atoms and the aryl is either phenyl or a homologue thereof, such as tolyl or xylyl. In all these cases, the catalysts may also be formed in situ, e. g. by adding to the starting material a cobalt halide and a tertiary or quaternary ammonium or phosphonium halide.

These catalysts have various advantages over those conventionally used in such carbonylations. Generally speaking, it is possible to obtain the same yields and conversions at relatively low temperatures as compared with the known catalysts. Due to the specific constitution of the novel catalysts very little cobalt carbonyl is formed so that the catalysts can be used repeatedly for a long time while at the same time the reacion products can be isolated free from soluble cobalt compounds in a very simple manner.

We prefer to carry out the reaction at temperatures between 70° to 250° C. Higher temperatures, e. g. up to 300° C., may also be used but ether formation is more pronounced under these conditions. We use superatmospheric pressure, preferably pressures above 50 atmospheres and most preferably in the range between 200 and 300 atmospheres. There is no principal obstacle against using higher pressures, such as 700 or 800 atmospheres.

The carbon monoxide used may be pure; it may also contain other gases, such as nitrogen, methane carbon dioxide and/or hydrogen. When working with a mixture of carbon monoxide with other gases, it is recommended to keep the minimum concentration of carbon monoxide at 10 per cent. The ratio between carbon monoxide and hydrogen, if this is present, has some influence on the nature of the reaction product. When working with an excess of carbon monoxide over hydrogen the main products are carboxylic acids, their esters or anhydrides. When using higher hydrogen concentrations the reaction product tends to contain more aldehydic substances. The carbon monoxide or the carbon monoxide-hydrogen mixture respectively should be substantially free from hydrogen sulfide.

The reaction may be carried out discontinuously, e. g. in pressure-tight vessels made from stainless steel or lined with corrosion-resistant material. We may also work continuously. In all cases there is no necessity to carry on the action of carbon monoxide on the starting material until all of the latter has been converted. We sometimes prefer to carry on the reaction until only part of the starting material has been converted, separate the unchanged material from the reaction product and lead it back to the reaction. The preferred method of working up the reaction mixture is distillation, eventually under superatmospheric pressure or under reduced pressure.

The conventional distillation techniques may be used, such as using azeotropic distillation or distilling in the presence of steam. The catalyst used will be found in most cases substantially unchanged in the distillation residue. As a rule it may be used again without further purification.

While the amount of catalyst used is not an essential feature of our process, we prefer to use a concentration of between 0.01 to 1 per cent of cobalt in the complex form calculated on the starting material. The activity of the catalysts may sometimes be increased by the addition of organic nitrogen bases, such as pyridine and its homologues. Since the starting material is usually used in excess, the use of an additional solvent may be avoided. In principle such solvents, e. g. hydrocarbons, esters, ethers, N-alkyl lactams, or the reaction products, may be employed.

The reaction runs most smoothly when starting with methanol. However, it may be also applied with satisfactory results to mono- and bivalent alcohols, such as ethanol, the propanols and butanols, ethylene glycol, propylene glycol and the butanediols. We may also use mixtures of saturated aliphatic alcohols, as they are obtained in the hydration of olefin mixtures. Ethers, as a rule, react less readily than alcohols. However, the novel catalysts offer a distinct advantage in this reaction as compared with the catalyst hitherto used. Typical examples of ethers are dimethyl ether, dipropyl ethers, and the corresponding mixed ethers.

The following examples will further illustrate how this invention may be carried out in practice. The invention, however, is not restricted to these examples. The parts are by weight.

Example 1

An autoclave made from stainless steel is charged with 1500 parts of methanol and 30 parts of di-(butylpyridinium)-cobalt tetrabromide $[(C_5H_5N)(C_4H_9)]_2 \cdot CoBr_4$. This mixture is treated at 120° C. with a mixture of equal parts by volume of carbon monoxide and hydrogen under 200 atmospheres for 48 hours. The liquid orange colored reaction product is distilled under normal pressure. Besides a small amount of water and unchanged methanol 65 parts of methyl acetate and 660 parts of acetaldehyde dimethylacetal are obtained. By recrystallization of the distillation residue from methanol 27 parts of the pure blue catalyst may be recovered. It is also possible to use the crude distillation residue as a catalyst.

Example 2

An autoclave made from stainless steel is charged with 1300 parts of methanol, 15 parts of dibutyl dipyridinium cobalt tetrabromide, 15 parts of triethyl butylammonium cobalt tetrabromide $[(C_2H_5)_3(C_4H_9)N]_2 \cdot CoBr_4$ and 3 parts of pyridine. This mixture is treated at 130° C. with a mixture of 4 parts by volume of carbon monoxide and 1 part by volume of hydrogen under 200 atmospheres for 50 hours. Distillation of the reaction products yields the following fractions: 895 parts of methyl acetate, 330 parts of acetic acid, 150 parts of acetaldehyde dimethyl acetal and a small amount of acetaldehyde. The reaction mixture contains also unchanged methanol (about 15 per cent) and water. The distillation residue is a dark blue mixture of the complex salts which may be used again.

Example 3

An autoclave made from stainless steel is charged with 450 parts of methanol and 5 parts of triethyl butylammonium cobalt tetrabromide. The mixture is treated at 130° C. with a mixture of 98 volume per cent of carbon monoxide and 2 volume per cent of hydrogen under 650 atmospheres until the gas is no longer consumed. Distillation of the pink reaction product yields besides water 380 parts of methyl acetate, 109 parts of acetic acid and 29 parts of acetaldehyde dimethyl acetal. The conversion is almost theoretical. The catalyst is found unchanged in the distillation residue. When working under otherwise identical conditions with pure carbon monoxide, the reaction product consists of 460 parts of methyl acetate, 20 parts of acetic acid, a small amount of unchanged methanol and some water.

Example 4

In an autoclave made from stainless steel a mixture of 96 per cent of carbon monoxide and of 4 per cent of hydrogen under 650 atmospheres is pressed into a mixture of 350 parts of methanol and 20 parts of triphenyl butyl phosphonium cobalt tetrabromide at 130° C. until the gas is no longer consumed. The conversion is almost theoretical and the reaction product contains 335 parts of acetic acid, 170 parts of methyl acetate and 20 parts of acetaldehyde dimethyl acetal. The catalyst is found unchanged in the distillation residue.

Example 5

A mixture of 350 parts of n-butanol with 30 parts of triethyl butylammonium cobalt tetrabromide is treated at 220° C. with a mixture of 96 per cent of carbon monoxide and 4 per cent of hydrogen under 650 atmospheres for 34 hours. The reaction product contains a little unchanged n-butanol, some water, 255 parts of n-butyl valerate and 71 parts of n-valeric acid. The catalyst is recovered practically unchanged.

Example 6

350 parts of butane diol-1.4 are treated in the presence of 35 parts of triethyl butylammonium cobalt tetrabromide at 200° C. with a gas mixture of 96 per cent carbon monoxide and 4 per cent hydrogen under 650 atmospheres for 27 hours. The reaction product consists of 180 parts crude greenish crystallized adipic acid (M. P. 148° C.) which may be recrystallized from water and 355 parts of a bluish-green liquid containing δ-valero-lactone and n-valeric acid besides adipic acid. These products may be separated from the blue complex salt by distillation in vacuo.

When under otherwise identical conditions a mixture of 13.5 parts of anhydrous cobalt bromide and 48 parts of triphenyl butylphosphonium bromide $$[(C_6H_5)_3(C_4H_9)P]Br$$

is used as a catalyst, a reaction product is obtained which consists of 210 parts of crude greenish adipic acid and 315 parts of a liquid consisting of δ-valero-lactone and valeric acid, adipic acid and the catalyst.

Example 7

A stainless steel autoclave is charged with a mixture of 300 parts of methanol, 5 parts of anhydrous cobalt bromide and 20 parts of triphenyl ethyl phosphonium iodide $$[C_6H_5)_3(C_2H_5)P]J$$

This mixture is treated at 200° C. with a mixture containing 96 per cent by volume of carbon monoxide and 4 per cent by volume of hydrogen under 700 atmospheres for 30 hours. The distillation of the reaction product yields 520 parts of a 98.6 per cent acetic acid and 6 parts of methyl acetate. The conversion is almost quantitative. The distillation residue consists of the green complex salt:

$$[(C_6H_5)_3(C_2H_5)P]_2CoJ_2Br_2$$

Example 8

A mixture of 200 parts of butane diol-1.4 with 30 parts of the complex salt mentioned at the end of the preceding example is treated at 180° C. with a gas mixture of 96 per cent CO and 4 per cent $H_2$ under 700 atmospheres for 30 hours. The reaction product consists of 247 parts of crude greenish adipic acid and 90 parts of a greenish liquid consisting essentially of n-valeric acid besides adipic acid and the complex salt.

Example 9

In a simple steel autoclave a solution of 100 parts of dimethyl ether in 200 parts of N-methyl pyrrolidone is treated at 180° C. with a 96 per cent CO, 4 per cent $H_2$ mixture under 700 atmospheres in the presence of 33 parts of di-tetra ethylammonium-cobalt dibromide di-iodide of the formula

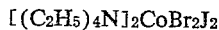

$$[(C_2H_5)_4N]_2CoBr_2J_2$$

for 14 hours. Distillation of the reaction product yields 187 parts of acetic acid anhydride besides unchanged methyl pyrrolidone and a small amount of dimethyl ether. This corresponds to an almost quantitative yield based on an 84 per cent conversion.

The catalysts used in the preceding examples have been selected to demonstrate various types of compounds. The principal factor in these catalysts, however, is not the selection of one or another alkyl or cycloalkyl radicle in the ammonium group but the complex state of the cobalt halide. It, therefore, is possible to exchange for the ethyl or butyl groups used other aliphatic hydrocarbon radicles, such as methyl, propyl or amyl. The ammonium radicle may also be formed from heterocyclic nitrogen compounds of the aliphatic type (e. g. pyrrolidine or piperidine) or the aromatic type (e. g. pyridine or alkyl pyridines). In all these cases the catalytic activity of the complex cobalt halide is maintained.

We claim:

1. In the production of aliphatic oxygen compounds by the action of carbon monoxide on oxygen compounds selected from the group consisting of saturated lower molecular aliphatic alcohols and their ethers at elevated temperatures and under superatmospheric pressure in the presence of cobalt compounds, the step which comprises using as the catalyst a complex compound of a cobalt halide with an organic halide selected from the group consisting of tertiary and quaternary ammonium and phosphonium halides.

2. In the process as set forth in claim 1 wherein carbon monoxide is used in admixture with hydrogen.

3. A process for the production of aliphatic oxygen compounds which comprises treating an oxygen compound selected from the group consisting of saturated lower molecular aliphatic alcohols and their ethers at temperatures between 70° and 250° C. and under pressures exceeding 50 atmospheres with carbon monoxide in the presence of a complex compound of a cobalt halide with an organic halide selected from the group consisting of tertiary and quaternary ammonium and phosphonium halides as the catalyst.

4. A process as set forth in claim 3, wherein at least one of the halide radicles in the complex cobalt halide used as the catalyst is a bromide radicle, the remainder being iodide radicles.

5. A process as set forth in claim 3 wherein the oxygen compound treated is a primary aliphatic alcohol having not more than 4 carbon atmos.

6. A process as set forth in claim 3 wherein the carbon monoxide is admixed with hydrogen in an amount not exceeding 40 parts by volume thereof for 60 parts by volume of carbon monoxide.

7. A process for the production of aliphatic oxygen compounds which comprises treating methanol at temperatures between 70° and 250° C. and under pressures exceeding 50 atmospheres with carbon monoxide in the presence of a complex compound of a cobalt halide with an organic halide selected from the group consisting of tertiary and quaternary ammonium and phosphonium halides as the catalyst.

8. A process as set forth in claim 7 wherein at least one of the halide radicles in the complex cobalt halide used as the catalyst is a bromide radicle, the remainder being iodide radicles.

9. A process for the production of aliphatic oxygen compounds which comprises treating methanol at temperatures between 70° and 250° C. and under pressures exceeding 50 atmospheres with mixtures of carbon monoxide and hydrogen containing at most 40 per cent by volume of hydrogen in the presence of a complex compound of a cobalt halide with an organic halide selected from the group consisting of tertiary and quaternary ammonium and phosphonium halides as the catalyst wherein at least one of the halide radicles in the complex cobalt halide used as the catalyst is a bromide radicle, the remainder being iodide radicles.

10. A process as set forth in claim 9 wherein the catalyst contains a quaternary ammonium radicle.

11. A process as set forth in claim 9 wherein the catalyst contains a quaternary phosphonium radicle.

12. A process for the production of aliphatic oxygen compounds which comprises treating dimethyl ether at temperatures between 70° and 250° C. and under pressures exceeding 50 atmospheres with carbon monoxide in the presence of a complex compound of a cobalt halide with an organic halide selected from the group consisting of tertiary and quaternary ammonium and phosphonium halides as the catalyst.

13. A process as set forth in claim 12, wherein at least one of the halide radicles in the complex cobalt halide used as catalyst is a bromide radicle, the remainder being iodide radicles.

14. A process for the production of aliphatic oxygen compounds which comprises treating dimethyl ether at temperatures between 70° and 250° C. and under pressures exceeding 50 atmospheres with mixtures of carbon monoxide and hydrogen containing at most 40 per cent by volume of hydrogen in the presence of a complex compound of a cobalt halide with an organic halide selected from the group consisting of tertiary and quaternary ammonium and phosphonium halides as the catalyst wherein at least one of the halide radicles in the complex cobalt halide used as the catalyst is a bromide radicle, the remainder being iodide radicles.

15. A process as set forth in claim 14 wherein the catalyst contains a quaternary ammonium radicle.

16. A process as set forth in claim 14 wherein the catalyst contains a quaternary phosphonium radicle.

17. A process for the production of aliphatic oxygen compounds which comprises treating butane diol-1.4 at temperatures between 70° and 250° C. and under pressures exceeding 50 atmospheres with carbon monoxide in the presence of a complex compound of a cobalt halide with an organic halide selected from the group consisting of tertiary and quaternary ammonium and phosphonium halides as the catalyst.

18. A process as set forth in claim 17 wherein at least one of the halide radicles in the complex cobalt halide used as the catalyst is a bromide radicle, the remainder being iodide radicles.

19. A process for the production of aliphatic oxygen compounds which comprises treating butane diol-1.4 at temperatures between 70° and 250° C. and under pressures exceeding 50 atmospheres with mixtures of carbon monoxide and hydrogen containing at most 40 per cent by volume of hydrogen in the presence of a complex compound of a cobalt halide with an organic halide selected from the group consisting of tertiary and quaternary ammonium and phosphonium halides as the catalyst wherein at least one of the halide radicles in the complex cobalt halide used as the catalyst is a bromide radicle, the remainder being iodide radicle.

20. A process as set forth in claim 19 wherein the catalyst contains a quaternary ammonium radicle.

21. A process as set forth in claim 19 wherein the catalyst contains a quaternary phosphonium radicle.

References Cited in the file of this patent

Copenhaver et al.: Acetylene and Carbon Monoxide Chemistry, Reinhold (1949), pp. 255–265, 297–8.